United States Patent [19]

Borsos

[11] Patent Number: 4,813,776

[45] Date of Patent: Mar. 21, 1989

[54] NOSE SUPPORT FOR EYEGLASSES

[76] Inventor: John D. Borsos, 23F Parkview Madison, Laurence Harbor, N.J. 08879

[21] Appl. No.: 165,419

[22] Filed: Feb. 29, 1988

Related U.S. Application Data

[63] Continuation of Ser. No. 865,878, May 21, 1986, abandoned, which is a continuation-in-part of Ser. No. 615,128, May 30, 1984, abandoned.

[51] Int. Cl.$^4$ .......................... G02C 1/00; G02C 5/12
[52] U.S. Cl. ....................................... 351/137; 351/88
[56] References Cited

U.S. PATENT DOCUMENTS

| | | | |
|---|---|---|---|
| 4,131,341 | 12/1978 | Bradley | 351/132 |
| 4,243,306 | 6/1981 | Bononi | 351/136 |
| 4,506,961 | 3/1985 | Palmieri | 351/137 |

FOREIGN PATENT DOCUMENTS 22657 of 1898 United Kingdom .................. 351/82

*Primary Examiner*—Rodney B. Bovernick
*Attorney, Agent, or Firm*—Arthur L. Lessler

[57] ABSTRACT

A high compliance flexible web preferably made of non-resilient or slightly resilient porometric material such as a woven plastic fabric extends between the rims of a pair of eyeglasses below and spaced apart from the bridge which interconnects the rims. The web supports the eyeglasses with very little slippage on the bridge of the nose of the wearer, and maintains a high comfort level by eliminating point contacts and local pressure concentrations, and permitting the movement of water vapor and air between the bridge of the nose of the wearer and the air space between the web and the bridge of the eyeglasses.

19 Claims, 2 Drawing Sheets

NOSE SUPPORT FOR EYEGLASSES

REFERENCE TO PATENT APPLICATION

This application is a continuation, of application Ser. No. 06/865,878, filed May 21, 1986 now abandoned which is a continuation-in-part of prior copending application Ser. No. 06/615,128 filed May 30, 1984, now abandoned.

BACKGROUND OF THE INVENTION

This invention relates to a nose support for eyeglasses having improved performance and comfort characteristics. The invention is applicable to prescription eyeglasses as well as nonprescription safety glasses or sunglasses.

Eyeglasses normally comprise two adjacent rims which support corresponding lenses, with the rims being interconnected by a bridge which is configured to rest on the bridge of the nose of the wearer.

In many eyeglasses the bridge is made of a rigid material which cannot, of course, accurately conform to the shape of the bridge of the nose of the wearer. As a result, pressure is concentrated at the regions of contact between the bridge of the nose of the wearer and the bridge of the eyeglasses, resulting in discomfort to the wearer and reducing the area of contact and thus the frictional force retaining the eyeglasses in place, so that there is an increased tendency for the eyeglasses to slip down the nose of the wearer.

One approach that has previously been taken to solving the pressure concentration problem has been to customize the bridge support portion of the eyeglasses to the shape of the nose of the particular wearer. See U.S. Pat. No. 4,131,341 to James B. Bradley, Jr. However, such an arrangement is cumbersome, expensive, and does not adequately address the problem of providing increased comfort to the wearer.

In other efforts to alleviate these problems, resilient contact pads of various kinds have been provided which support the eyeglasses on the bridge of the nose of the wearer. Such contact pads have been connected either to the bridge of the eyeglasses or directly or indirectly to the rims of the eyeglasses, with the intent that the resilient qualities of the pads would allow them to better conform to the shape of the nose of the wearer, so as to distribute the force required to support the eyeglasses and thus reduce pressure concentrations and resulting discomfort. Such resilient contact pad arrangements are described, for example, in the following Patents:

British Pat. No. 22,657 issued Apr. 29, 1898 to Thatcher;
U.S. Pat No. 2,032,843 issued Mar. 3, 1936 to Grier;
U.S. Pat No. 2,561,403 issued July 24, 1951 to Nelson;
U.S. Pat No. 4,070,104 issued Jan. 24, 1978 to Rice; and
U.S. Pat No. 4,243,306 issued Jan. 6, 1981 to Bononi.

Such resilient contact pads, however, also fail to provide an adequate level of wearer comfort; and the nature and shape of such pads tends to promote rather than reduce slippage on the nose of the wearer.

A support arrangement which enables adjustment of the position of the eyeglasses relative to the nose of the wearer, and which is intended for use with bifocals or trifocals, is described in U.S. Pat. No. 4,506,961 issued on Mar. 26, 1985 to Palmieri. In this arrangement what is essentially a movable bridge is provided by means of a strap 16 the ends of which are slidably secured to the eyeglass rims by means of clips 18, 19, 25. While the strap of Palmieri is obviously made of a flexible material, as is evident from the drawings of said patent, Palmieri does not identify the material involved.

In one embodiment of the Palmieri arrangement (which embodiment provides an adjustability feature), the central portion of the strap rests directly on the nose of the wearer. In another embodiment, two separate straps are employed merely as attachment devices for an interconnecting bridge 39 which rests on the nose of the wearer. Each strap is slidably movable on an adjacent rim of the eyeglasses. Both embodiments, however, provide an inadequate degree of wearer comfort and resistance to slippage.

The strap 24 of Palmieri provides a means of adjustment, but no added comfort, or elimination of slippage, or conformance to the shape of the nose of the wearer. In fact, in the arrangement of Palmieri there is actually a degradation from the normal suitability of the bearing surfaces to rest on the nose of the wearer. The Palmieri strap must necessarily be made of a hard, springy material to stay in the channels provided by the arrangement of Palmieri in the areas not immediately adjacent to the rim attaching clips; otherwise the strap would fall out of said areas.

The strap 24 of Palmieri also must necessarily be narrow to slidably fit into the slots 44 of the bridge so as to provide the desired adjustability, such narrowness providing a relatively small contact area with the nose of the wearer, with an accompanying excess concentration of pressure and resulting discomfort and objectionable slippage.

As is evident from FIG. 3 of Palmieri, the curvature of the nose contact portion of the strap is different for different positions of the strap, and in its lower positions the strap is nearly flat and the nose contact portion is minimal, so that the strap rests on only the top central surface of the nose of the wearer, a situation inconsistent with wearer comfort and proper slip-resistant functioning.

The Palmieri arrangement thus uses channels and clips on the rims of the eyeglasses to allow the central portion, which rests on the nose, to be raised or lowered. There is no suggestion of the use of a conformable highly compliant or pliable band or web to minimize slippage and improve comfort. In fact, such a band or web would lack sufficient stiffness to function in the arrangement of Palmieri.

Accordingly, an object of the present invention is to provide a relatively inexpensive nose support for eyeglasses which overcomes the disadvantages of prior art eyeglass nose supports.

SUMMARY OF THE INVENTION

As herein described, there is provided a nose support for eyeglasses having first and second lenses, first and second rims for holding said first and second lenses respectively, and a bridge interconnecting said rims, said bridge having a lower surface adjacent said rims. The nose support comprises a high compliance preferably non-resilient flexible web disposed below and spaced apart from said bridge, said web having an upper surface adjacent the lower surface of said bridge and a lower surface parallel to said upper surface. First fastening means is provided for securing a first end of said web to a first part of said eyeglasses, and second fastening means is provided for securing a second end of said web to a second part of said eyeglasses. The web has a length between its ends sufficiently long to permit the web to assume an upwardly directed arcuate shape while being sufficiently short so that no intermediate portion of the web contacts the lower surface of the bridge.

As herein described, there is also provided a nose support for eyeglasses having first and second lenses, first and second rims for holding said first and second lenses respectively, and a bridge interconnecting said rims. The bridge has a lower surface adjacent the rims. The nose support comprises a high compliance flexible elongated web disposed below the bridge. The web has an upper surface adjacent the lower surface of the bridge and a lower surface parallel to said upper surface. First fastening means secures a first end of the web to a first part of the eyeglasses. Second fastening means secures a second end of the web to a second part of the eyeglasses. A central portion of the web substantially midway between the first and second fastening means is affixed to the lower surface of the bridge along a line substantially perpendicular to the plane of the rims, so as to leave little or no slack in the web and thus give said web an inverted V-shaped configuration, so that when the eyeglasses are worn, the top of the web is out of contact with the nose of the wearer.

IN THE DRAWING

DETAILED DESCRIPTION

Figure 1:
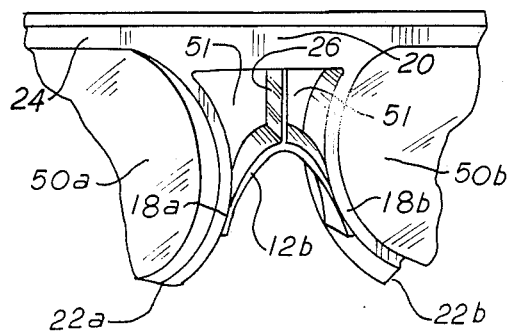
FIG. 1 is a front isometric view showing a portion of a pair of eyeglasses having a nose support in accordance with a preferred embodiment of the present invention.

As shown in FIG. 1, eyeglass lenses 50a and 50b are mounted in corresponding rims 22a and 22b of the eyeglasses 24. The rims 22a and 22b are interconnected by a relatively rigid bridge 20.

Connected between adjacent portions of the rims 22a and 22b in a region below and spaced apart rom the bridge 20, is a web, band or strap 12b, the ends of which are secured to the rims 22a and 22b by suitable fastening elements 18.

An optional flexible web or flexible support 26 is secured at its upper end to the bridge 20; and the lower end of the support 26 is secured to an intermediate portion of the web 12b, for holding the (preferably non-resilient and highly compliant but optionally slightly resilient and slightly less compliant) web 12b in an arched configuration when the eyeglasses 24 are not being worn.

Figure 2:
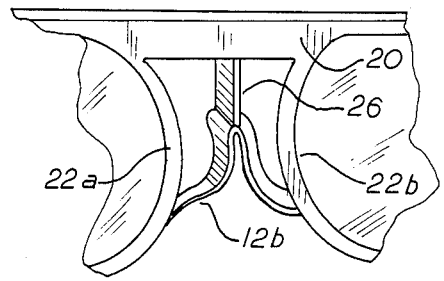
FIG. 2 is a front isometric view of the bridge portion of a pair of eyeglasses in accordance with said preferred embodiment of the invention wherein a highly compliant web is employed, as said portion appears when the eyeglasses are not being worn.
Figure 3:
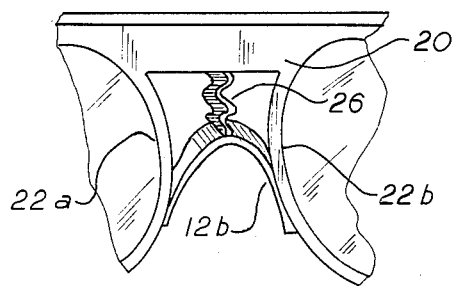
FIG. 3 is a front isometric view of the bridge portion of a pair of eyeglasses in accordance with said preferred embodiment of the invention, as said portion appears when the eyeglasses are being worn.

Regardless of whether the web 12b is made of a slightly resilient or a non-resilient material, the characteristics of the material are selected so that the web has the appearance shown in FIG. 2 when the eyeglasses 24 are not being worn. The use of a slightly resilient specially formed material for the web 12b provides a web which, when placed on the nose, exerts a very gentle inward pressure on the sides of the nose for special anti-slippage properties, useful when engaging in sports or other activities involving more than the normal extent of movement.

The support 26 is more of a positioning device than a supporting device, since the web 12b that it "supports" is extremely light. If support 26 were to be shortened to take out most (but not all) of the slack in web 12b, i.e. leaving web 12b with a little less slack than is shown in FIG. 2, the narrowness of the web 12b near its top and the resultant gentle pressure this configuration would create on the sides of the nose of the wearer near the top, would result in a decrease in pressure on the top midline of the nose when the eyeglasses 24 are worn, thus providing an effect similar to that of a specially formed slightly less resilient web especially suitable for sports and the like.

The support 26 is made of a high compliance material which is preferably non-resilient, but which is preferably slightly resilient for applications where improved anti-slippage characteristics are important.

Figure 4:
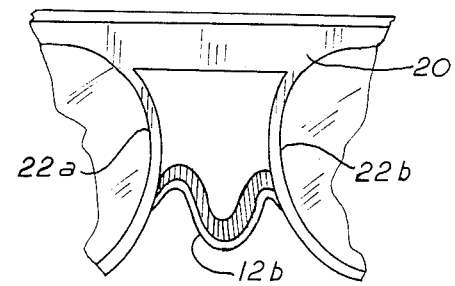
FIG. 4 is a front isometric view of the bridge portion of a pair of eyeglasses in accordance with another embodiment of the invention (wherein a highly compliant web is employed and the intermediate support 26 shown in FIGS. 1 and 2 is absent), as said portion appears when the eyeglasses are not being worn.
Figure 5:
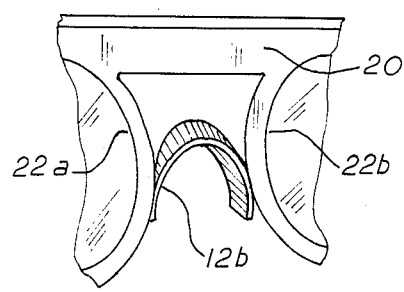
FIG. 5 is a front elevation view of the bridge portion of a pair of eyeglasses in accordance with said other embodiment of the invention, as said portion appears when (i) a highly compliant web is employed and the eyeglasses are being worn, or (ii) a slightly less compliant web is employed, in which event the web 12b has a generally similar appearance whether or not the eyeglasses are being worn.

As shown in the embodiment of FIGS. 4 and 5, the support 26 may be dispensed with if desired. However, the result (for highly compliant versions of the web 12b) will be an initially sagging position of the web 12b, as shown in FIG. 4, requiring the wearer to be a little more careful when putting on the glasses, to avoid a fold or twist in the web 12b.

The flexible web 12b is preferably made of a high compliance porous material such as a woven plastic or man-made porometric material, or a suitable synthetic fabric such as Orlon or Dacron, although a homogeneous substance such as a soft plastic could be used. A natural fabric such as cotton may also be used for the web 12b, but a hypoallergenic material is preferred. If porous or porometric, the web 12b should preferably also be made so as to be removable for cleaning or inexpensive replacement.

Such a high compliance material permits the web 12b to conform completely and comfortably to the three-dimensional configuration of the nose of the wearer, with the web 12b supporting the eyeglasses 24 on the bridge of the nose of the wearer.

When a porous or porometric material is employed, the web 12b maintains a high comfort level by permitting the movement of water vapor and air through the web, between the bridge of the nose of the wearer and the air space 51 between the upper surface of the web 12b and the lower surface of the bridge 20. Air movement through the space 51 thus provides a drying and cooling effect for the portion of the skin of the nose in contact with the web 12b, by facilitating the evaporation of moisture from the skin, through the porous web 12b.

The lower surface of the web 12b, i.e. the surface that contacts the nose of the wearer, should preferably be made of a naturally textured material or be finished to have a relatively high-friction surface so as to further minimize any tendency of the eyeglasses 24 to slide down the nose.

The fastening means 18 may comprise glue, Velcro, snap fastening means, a weld, a press fit, or the like. Preferably, at least one of the fastening means 18 may provide for adjustment, preferably via the use of Velcro fastening means, so that the length of the web 12b between the two fastening means 18 can be adjusted to vary the position of the eyeglasses on the wearer.

As shown in FIG. 2, the length of highly compliant versions of the web 12b is such that when the eyeglasses 24 are not being worn, the web 12b has an arched configuration due to the support web 26, and has sufficient slack to enable the web 12b to conform to the shape of the nose of the wearer without any intermediate portion of the web 12b between the two fastening means 18 normally contacting the underside of the bridge 20.

Therefore the web 12b must be sufficiently long to permit it to assume an upwardly directed arcuate shape while being sufficiently short so that no intermediate portion of the web contacts the lower surface of the bridge 20. With this arrangement, the web is basically out of contact with the frame (except, of course, at the ends of the web) and is free to move in various directions to conform to the width and shape of the nose of the wearer.

If desired, the web 12b may be impregnated with a small amount of a material which emits a pleasant-smelling aroma.

FIGS. 6 through 9 illustrate another embodiment of the invention and variations thereof.

Figure 6:
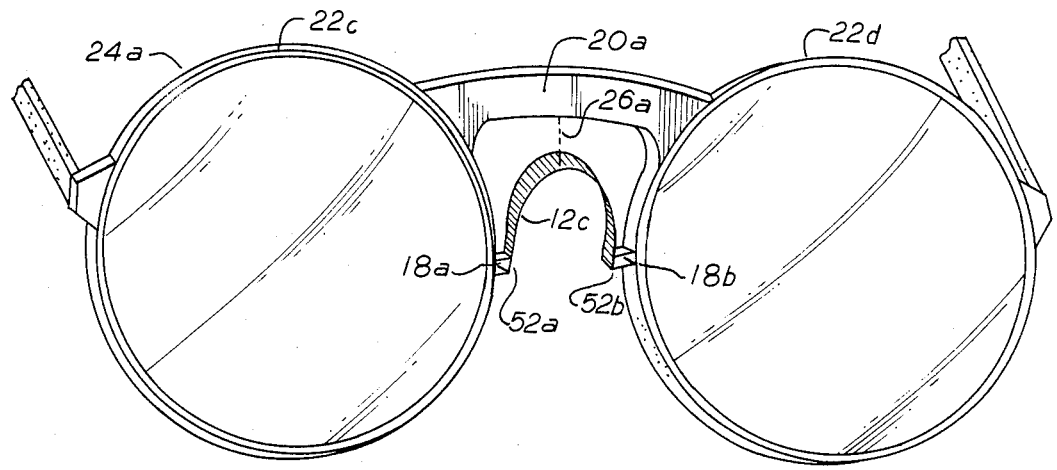
FIG. 6 is a front isometric view showing a portion of a pair of eyeglasses having a nose support in accordance with still another embodiment of the invention.

The eyeglasses 24a shown in FIG. 6 have lens rims 22c and 22d interconnected by a bridge 20a.

Extending into the region below the bridge 20a from the rims 22c and 22d are respective fastening means 18a and 18b, each of said fastening means having any appropriate shape (a rectangular prism shape is shown in FIG. 6). The base of each of the fastening means 18a and 18b is attached to the corresponding rim and the front and back surfaces of said fastening means lie in planes substantially parallel to the planes of the rims. The rectangular surfaces of the inner ends 52a and 52b of the fastening means 18a and 18b may be covered with a hook-and-pile fastener material such as Velcro, to allow for adjustability as well as provide for the means of attachment, and to facilitate removal and replacement of the web 12c.

The highly compliant flexible web 12c then has end portions also made of a hook-and-pile fastener material such as Velcro, so that the web 12c may be secured in position below the bridge 20a, and between the rims 22c and 22d, by engagement of the ends of the web 12c with the rectangular surfaces of the inner ends 52a and 52b of the fastening means 18a and 18b.

Figure 7:
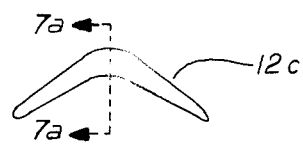
FIG. 7 is a top plan view of one possible configuration of the support web used in the eyeglasses shown in FIG. 6, unmounted and flattened.
Figure 9:
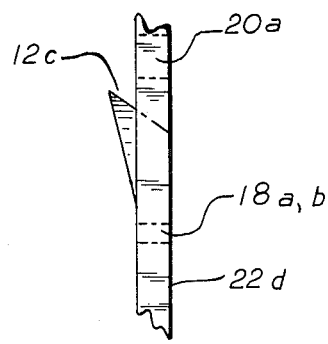
FIG. 9 is a right side view of the eyeglasses shown in FIG. 6.

As seen in FIGS. 7 and 9, the web 12c is preferably shaped so the portion resting on the nose has a slant matching that of the nose in front elevation view. This is accomplished, as best seen in FIG. 7, by making the intermediate portion of the web wider than the end portions thereof, the web when laid flat having a generally V-shaped configuration, so that the central portion of the web may tilt to match the slant of the top surface of the nose when the eyeglasses are worn.

The high compliance of the web 12c permits it to precisely align itself with the nose surface of the wearer. The interaction of the ends of the web with the fastening means 18a and 18b can detachably secure the web to the fastening means and permit the substitution of different webs to accomodate wearers having widely varying nose shape characteristics. Different web styles, designs and materials may also be used, as for sports activities, to match different clothing outfits, etc.

If desired, an intermediate flexible support 26a similar to the support 26 shown in FIG. 1, may be employed to maintain a desired upwardly arched initial orientation of the web 12c.

The web 12c may be made of any suitable non-resilient flexible natural or artificial material. An artificial material such as nylon, Orlon, Dacron or another plastic is preferred in order to preclude the growth of micro-organisms and to provide hypoallergenic qualities.

Figure 8:
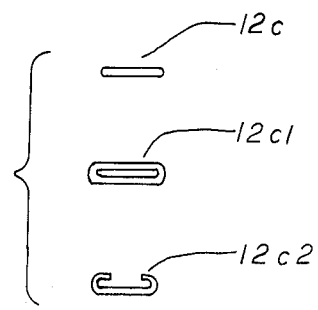
FIG. 8 shows possible side cross-sectional views of the web shown in FIG. 7, taken along the cutting place 7a—7a therein.

One version of the web 12c shown as 12c1 in FIG. 8 may be provided with a hollow interior 31. Another version shown as 12c2 in FIG. 8 may be provided with an open longitudinal central channel or slit which permits the insertion of disposable strips of various colors and types, for matching clothing, for facilitating use of strips impregnated with a mild aromatic substance, etc.

The web 12c can have perforations or be foraminous throughout, or can have an open weave, to provide improved heat and fluid transfer characteristics between the surface of the nose of the wearer and the surrounding atmosphere. The web 12c can alternatively be homogenous, but preferably is of a permeable nature in that case.

The web 12c and its variations described above provides extraordinary comfort to the wearer, especially for eyeglasses which employ relatively thick lenses and are therefor relatively heavy; and does not exhibit the smooth, slippery configuration of prior art nose supports in the area of contact with the nose of the wearer.

Figure 10:
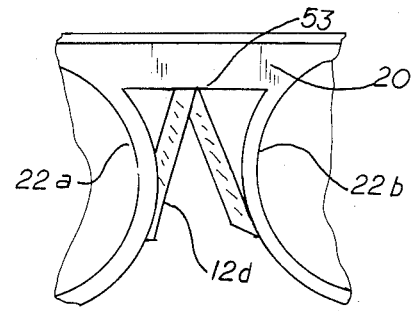
FIG. 10 is a front isometric view of the bridge portion of a pair of eyeglasses in accordance with still another embodiment of the invention.

FIG. 10 shows another embodiment of the invention which is generally similar to the embodiment shown in FIG. 4. The web 12d is made of the same material as the web 12b. The center of the web 12d is affixed to the bottom surface of the bridge 20 along a line 53 perpendicular to the plane of the rims 22a and 22b, so as to leave little or no slack in the web 12d and thus give said web an inverted V-shaped configuration, so that when the eyeglasses are worn, the top of the web 12d, i.e. the line 53 along which it is affixed to the bridge 20 of the eyeglasses 24, is out of contact with the nose of the wearer.

I claim:

1. A nose support for eyeglasses having first and second lenses, first and second rims for holding said first and second lenses respectively, and a bridge interconnecting said rims, said bridge having a lower surface adjacent said rims, said nose support comprising:

an elongated high compliance non-resilient porous flexible web disposed below and spaced apart from said bridge, said web having an upper surface adjacent the lower surface of said bridge and a lower surface parallel to said upper surface, leaving an air space between the lower surface of said bridge and the upper surface of said web, said web extending between adjacent attachment portions of said first and second rims respectively;

first fastening means for securing a first end of said web to said attachment portion of said first rim;

second fastening means for securing a second end of said web to said attachment portion of said second rim;

at least one of said fastening means being adjustable to vary the length of said web between said attachment portions of said rims;

said web having a length between said attachment portions sufficiently long to permit the web to assume an upwardly directed arcuate shape while being sufficiently short so that no intermediate portion of the web contacts the lower surface of the bridge; and a flexible non-resilient support element having a first end connected to an intermediate portion of said bridge and a second end connected to an intermediate portion of the upper surface of said web below said bridge, to cause said web to assume an upwardly directed arcuate shape.

2. The nose support according to claim 1, wherein said web comprises a woven material.

3. The nose support according to claim 1, wherein said web comprises a poromeric material.

4. The nose support according to claim 1, wherein said web comprises a synthetic fabric.

5. The nose support according to claim 4, wherein said synthetic fabric comprises nylon, Orlon or Dacron.

6. The nose support according to claim 1, wherein said web comprises a hypoallergenic material.

7. The nose support according to claim 1, wherein said web is impregnated with an aromatic substance.

8. The nose support according to claim 1, wherein said web is detachably secured to said first and second fastening means.

9. A nose support for eyeglasses having first and second lenses, first and second rims for holding said first and second lenses respectively, and a bridge interconnecting said rims, said bridge having a lower surface adjacent said rims, said nose support comprising:

a high compliance flexible elongated web disposed below said bridge, said web having an upper surface adjacent the lower surface of said bridge and a lower surface parallel to said upper surface;

first fastening means for securing a first end of said web to a first part of said eyeglasses;

second fastening means for securing a second end of said web to a second part of said eyeglasses;

a central portion of the web substantially midway between said first and second fastening means being affixed to the lower surface of the bridge along a line substantially perpendicular to the plane of the rims, so as to leave little or no slack in the web and thus give said web an inverted V-shaped configuration, so that when the eyeglasses are worn, the top of the web is out of contact with the nose of the wearer.

10. The nose support according to claim 9, wherein said web is detachably secured to said first and second fastening means.

11. The nose support according to claim 9 wherein said web is slightly resilient so that, when the eyeglasses are worn with the web resting on the nose of the wearer, the web exerts a gentle inward pressure on the sides of the nose to provide increased resistance against slippage of the web on the nose.

12. The nose support according to claim 9, wherein at least one of said fastening means is adjustable to vary the length of said web between said first and second fastening means.

13. The nose support according to claim 9, wherein said web comprises a woven material.

14. The nose support according to claim 9, wherein said web comprises a porometric material.

15. The nose support according to claim 9, wherein said web comprises a synthetic fabric.

16. The nose support according to claim 15, wherein said synthetic fabric comprises nylon, Orlon or Dacron.

17. The nose support according to claim 9, wherein said web comprises a hypoallergenic material.

18. The nose support according to claim 9, wherein said web is impregnated with an aromatic substance.

19. A nose support for eyeglasses having first and second lenses, first and second rims for holding said first and second lenses respectively, and a bridge interconnecting said rims, said bridge having a lower surface adjacent said rims, said nose support comprising:

an elongated high compliance flexible web disposed below and spaced apart from said bridge, said web having an upper surface adjacent the lower surface of said bridge and a lower surface parallel to said upper surface, leaving an air space between the lower surface of said bridge and the upper surface of said web, said web extending between adjacent attachment portions of said first and second rims respectively;

first fastening means for securing a first end of said web to said attachment portion of said first rim;

second fastening means for securing a second end of said web to said attachment portion of said second rim;

said web having a length between said attachment portions sufficiently long to permit the web to assume an upwardly directed arcuate shape while being sufficiently short so that no intermediate portion of the web contacts the lower surface of the bridge; and a flexible support element having a first end connected to an intermediate portion of said bridge and a second end connected to an intermediate portion of the upper surface of said web below said bridge, to cause said web to assume an upwardly directed arcuate shape.

* * * * *